US010096984B2

(12) United States Patent
Kimura et al.

(10) Patent No.: US 10,096,984 B2
(45) Date of Patent: Oct. 9, 2018

(54) HOUSING ATTACHED TO MULTI-POLE FUSIBLE LINK, FUSE, AND FUSE BOX

(71) Applicant: Pacific Engineering Corporation, Ogaki-Shi (JP)

(72) Inventors: Masahiro Kimura, Ogaki (JP); Fumiyuki Kawase, Ogaki (JP)

(73) Assignee: PACIFIC ENGINEERING CORPORATION, Ogaki-Shi (JP)

( * ) Notice: Subject to any disclaimer, the term of this patent is extended or adjusted under 35 U.S.C. 154(b) by 0 days.

(21) Appl. No.: 15/319,510

(22) PCT Filed: Sep. 15, 2015

(86) PCT No.: PCT/JP2015/076115
§ 371 (c)(1),
(2) Date: Dec. 16, 2016

(87) PCT Pub. No.: WO2016/067778
PCT Pub. Date: May 6, 2016

(65) Prior Publication Data
US 2017/0324233 A1    Nov. 9, 2017

(30) Foreign Application Priority Data

Oct. 30, 2014    (JP) .................................. 2014-221187

(51) Int. Cl.
*H05K 7/00*    (2006.01)
*H02G 3/16*    (2006.01)
(Continued)

(52) U.S. Cl.
CPC ............ *H02G 3/16* (2013.01); *H01H 85/205* (2013.01); *H01H 85/2045* (2013.01); *H02G 3/081* (2013.01); *H01H 2085/208* (2013.01)

(58) Field of Classification Search
CPC ...... H02G 3/16; H02G 3/081; H01H 85/2045; H01H 85/205; H01H 2085/208
(Continued)

(56) References Cited

U.S. PATENT DOCUMENTS 5,229,739 A * 7/1993 Oh .................... H01H 69/02
337/255
6,359,543 B2 * 3/2002 Endo .................. H01H 85/0417
337/159
(Continued)

FOREIGN PATENT DOCUMENTS

JP    H07-105826 A    4/1995
JP    2000-286005 A    10/2000

OTHER PUBLICATIONS

International Search Report for PCT/2015/076115 (in English and Japanese) dated Dec. 8, 2015 (4 pages total).

*Primary Examiner* — Hung S Bui
(74) *Attorney, Agent, or Firm* — Shumaker, Loop & Kendrick, LLP (57) ABSTRACT

The present invention provides a housing, fuse, and fuse box, with which it is possible to differentiate a multi-pole fusible link and prevent misassembly, while holding down costs. This housing is attached to a multi-pole fusible link contained within a containing part of a fuse box, and is provided with misassembly-preventing protrusions which are removable according to the type of multi-pole fusible link, the locations of the misassembly-preventing protrusions corresponding to the locations of recesses which are provided to the containing part that is to contain the multi-pole fusible link, and in which the misassembly-preventing protrusions can be contained.

4 Claims, 8 Drawing Sheets

(51) Int. Cl.
*H02G 3/08* (2006.01)
*H01H 85/20* (2006.01)

(58) Field of Classification Search
USPC .......................................... 361/807–810, 837
See application file for complete search history.

(56) References Cited

U.S. PATENT DOCUMENTS

| | | | |
|---|---|---|---|
| 6,461,201 B1 | 10/2002 | Maeda et al. | |
| 6,496,096 B2 * | 12/2002 | Kondo | H01H 85/0417 337/231 |
| 6,759,938 B2 * | 7/2004 | Matsumura | H01H 85/044 337/161 |
| 6,830,482 B2 * | 12/2004 | Matsumura | H01H 85/044 29/623 |
| 8,130,070 B2 * | 3/2012 | Shibata | H01H 85/044 29/623 |
| 8,414,334 B2 * | 4/2013 | Nakayama | H01H 9/042 439/620.01 |
| 9,812,278 B2 * | 11/2017 | Iwata | H01H 85/143 |

* cited by examiner

HOUSING ATTACHED TO MULTI-POLE FUSIBLE LINK, FUSE, AND FUSE BOX

TECHNICAL FIELD

The present invention relates to a housing attached to a multi-pole fusible link, which is mainly connected to an automobile electric circuit or the like, a fuse which attaches the housing to the multi-pole fusible link, and a vehicle fuse box containing the fuse.

BACKGROUND ART

In the past, a multi-pole fusible link has been used to protect various electric components when an overcurrent flows between a battery and various electric components in an automobile or the like. More specifically, the multi-pole fusible link mainly includes an input terminal part to which a battery power supply or the like is connected, a busbar part in which a current input from the input terminal part flows, and a plurality of output terminal parts connected to the busbar part through fusible parts.

A housing is attached to the multi-pole fusible link to cover the busbar part and the fusible parts. This housing is made of an insulating resin or the like and electrically and physically protects the busbar part and the fusible parts to make it possible to use the multi-pole fusible link that is safely attached to a fuse box or the like.

Meanwhile, the fuse box to which a plurality of multi-pole fusible links of different types are attached is generally used, and predetermined multi-pole fusible links must be correctly fitted on predetermined places.

There are many different type of such multi-pole fusible links including those having fusible parts the resistances of which are changed depending on the magnitudes of overcurrents to be cut off and those having input terminal parts the shapes of which are changed depending on the magnitudes. However, the multi-pole fusible links having fusible parts changed in resistance and having input terminal parts changed in shape are similar to each other in entire shape, and a user is hard to visually differentiate the types of the multi-pole fusible links from each other. For this reason, the user is difficult to select a specific multi-pole fusible link from the plurality of multi-pole fusible links and to fit it on a predetermined place in a fuse box. As a result, the specific multi-pole fusible link may be fitted on a wrong place disadvantageously.

Thus, according to a conventional technique, marks set depending on the types of the multi-pole fusible links are printed on the housing to make it possible to easily differentiate the types of the multi-pole fusible links from each other so as to prevent the multi-pole fusible links from being fitted on erroneous places, or the shape of a housing itself is changed depending on the types of multi-pole fusible links to physically prevent the multi-pole fusible links from being fitted on erroneous places.

However, merely printing the marks on the housing cannot completely prevent the user from erroneously recognizing the marks and fitting the multi-pole fusible links on wrong places. Furthermore, when the user tries to change the shape of the housing itself depending on the types of the multi-pole fusible links, a new die or the like for molding the housing must be prepared, and manufacturing costs therefor increase disadvantageously.

SUMMARY OF INVENTION

Technical Problems

The invention of the application has been made in consideration of the above problems and has as its object to provide a housing, a fuse, and a fuse box which enable differentiation between multi-pole fusible links and prevention of misassembly while holding down costs.

Solutions to Problems

A housing according to the present invention is a housing attached to a multi-pole fusible link contained in a containing part of a fuse box, including a misassembly-preventing protrusion which can be removed depending on the type of the multi-pole fusible link. The position of the misassembly-preventing protrusion corresponds to the position of a recess which can contain the misassembly-preventing protrusion and which is formed in the containing part where the multi-pole fusible link should be contained.

According to the characteristic feature, the misassembly-preventing protrusions are removed depending on the types of the multi-pole fusible links to make it possible to differentiate the types of the multi-pole fusible links from each other in terms of shape, on the basis of the presence/absence of the misassembly-preventing protrusions. Furthermore, since the positions of the misassembly-preventing protrusions correspond to the positions of the recesses in the fuse box in which the multi-pole fusible links should be contained, even when the multi-pole fusible link is likely to be contained in a wrong place, the misassembly-preventing protrusions contact with a part of the containing part of the fuse box and do not allow the erroneous placing. Therefore, it is possible to physically prevent misassembly.

The housing is a common part which can be commonly attached to multi-pole fusible links of different types having similar shapes. The misassembly-preventing protrusions may be removed afterward, depending on the types of the multi-pole fusible links to make it possible to achieve differentiation between the multi-pole fusible links and prevention of misassembly. Costs required for this are considerably lower than those required to newly prepare a die or the like for molding a housing to change the shape of the housing itself depending on the types of multi-pole fusible links as in a conventional technique.

Furthermore, the housing according to the present invention is characterized in that a plurality of misassembly-preventing protrusions are formed.

According to the characteristic feature, since the plurality of misassembly-preventing protrusions are formed, misassembly-preventing protrusions to be removed can be selected depending on the types of the multi-pole fusible links. As a result, the number of multi-pole fusible links which can be differentiated from each other in terms of shape increases. Thus, when a plurality of multi-pole fusible links of different types having similar shapes are present, differentiation between the multi-pole fusible links and prevention of misassembly can be achieved. Furthermore, since the housing is a common part which can be commonly attached to the plurality of multi-pole fusible links, a cost reduction effect is more conspicuous than in the conventional technique.

Furthermore, the fuse according to the present invention includes a multi-pole fusible link and the housing according to the present invention, and is characterized in that the housing is attached to a part of the multi-pole fusible link.

According to the characteristic feature, when the fuses according to the present invention including multi-pole fusible links of different types are fitted in a fuse box or the like and used, differentiation between the fuses and prevention of misassembly can be achieved.

Furthermore, the fuse box according to the present invention is a fuse box including a containing part which can contain the fuse according to the present invention, and is characterized in that a recess which can contain a misassembly-preventing protrusion disposed in a housing for the fuse is formed in the containing part.

According to the characteristic feature, when the fuses according to the present invention including multi-pole fusible links of different types are fitted, misassembly of the fuses can be prevented.

Advantageous Effects of Invention

As described above, the housing, the fuse, and the fuse box of the present invention enable differentiation between multi-pole fusible links and prevention of misassembly while holding down costs.

DETAILED DESCRIPTION

First Embodiment

A first embodiment of the present invention will be described below with reference to the accompanying drawings. The shapes, materials, and the like of the members such as multi-pole fusible links, fuses, and fuse boxes in the embodiment (will be described below) merely show examples, and are not limited to the examples.

Figure 1A:
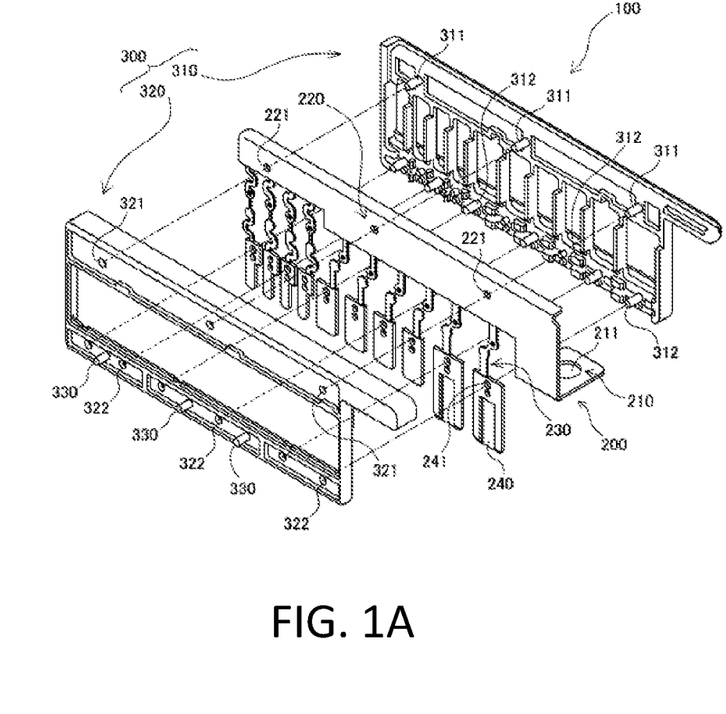
FIG. 1(a) is an exploded perspective view of a fuse according to the present invention.
Figure 1B:
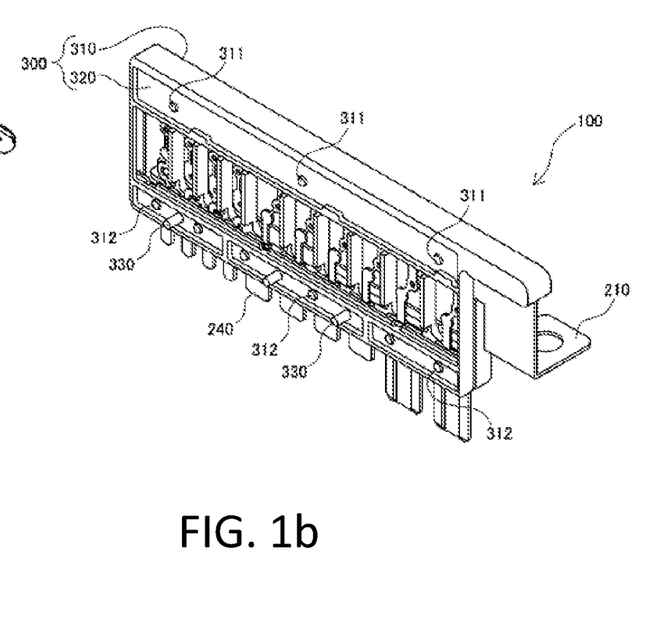
FIG. 1(b) is an overall perspective view showing the fuse according to the present invention.

FIG. 1 shows a fuse 100 according to the present invention. The fuse 100 includes a multi-pole fusible link 200 and a housing 300. The multi-pole fusible link 200 includes an input terminal part 210 having a connection hole 211 to which a battery power supply or the like is connected, a busbar part 220, a plurality of fusible parts 230 connected to the busbar part 220, and a plurality of output terminal parts 240 connected through the fusible parts 230. A plurality of first through holes 221 are formed in the busbar part 220, and second through holes 241 are formed in the output terminal parts 240, respectively.

The multi-pole fusible link 200 is formed such that a conductive metal plate having a uniform thickness and made of copper or the like is punched out in the form shown in FIG. 1(a) to integrally mold the input terminal part 210, the busbar part 220, the fusible parts 230, and the output terminal parts 240. The input terminal part 210, the busbar part 220, the fusible parts 230, and the output terminal parts 240 may be independently prepared and connected by welding or the like to configure the multi-pole fusible link 200.

The housing 300 includes a rear-side housing 310 and a front-side housing 320. The rear-side housing 310 includes a plurality of first connection protrusions 311 and a plurality of second connection protrusions 312 which are formed on the internal surface thereof, and the front-side housing 320 includes first connection holes 321 and second connection holes 322. These first and second connection holes penetrate the front-side housing 320 from the internal surface to the external surface thereof. At positions adjacent to each of the second connection holes 322, a total of three misassembly-preventing protrusions 330 are formed to protrude from the surface of the front-side housing 320. The rear-side housing 310 and the front-side housing 320, as will be described below, cover the multi-pole fusible link 200 to clamp it therebetween and can be coupled to each other. The rear-side housing 310 and the front-side housing 320 are made of an insulating synthetic resin or the like and molded in the form shown in FIG. 1(a) by using dies.

An assembly method of the fuse 100 will be described below with reference to FIG. 1(a). The rear-side housing 310 is applied to the rear side of the multi-pole fusible link 200 such that the first connection protrusions 311 of the rear-side housing 310 penetrate the first through holes 221 of the busbar part 220, respectively, and the second connection protrusions 312 penetrate the second through holes 241, respectively. The front-side housing 320 is applied to the front side of the multi-pole fusible link 200 such that the distal ends of the first connection protrusions 311 of the rear-side housing 310 protruding from the surface of the multi-pole fusible link 200 penetrate the first connection holes 321 of the front-side housing 320, respectively, and the distal ends of the second connection protrusions 312 penetrate the second connection holes 322, respectively. As a result, the state shown in FIG. 1(b) is obtained.

Figure 2A:
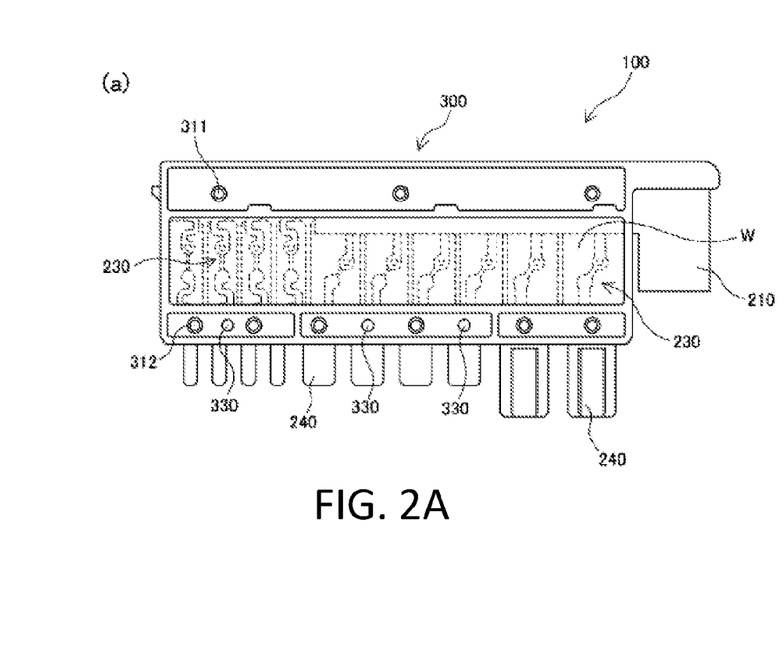
FIG. 2(a) is a front view of a fuse shown in FIGS. 1(a) and 1(b)
Figure 2B:
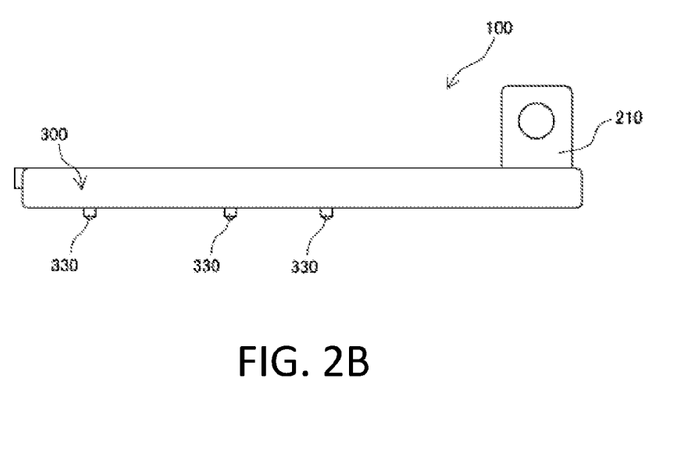
FIG. 2(b) is a plan view of the fuse.

As shown in FIG. 1(b), the busbar part 220 and the fusible parts 230 of the multi-pole fusible link 200 are covered with the housing 300, and the input terminal part 210 and the output terminal parts 240 are exposed from the housing 300 to be connected to external terminals and the like. In this state, the distal ends of the first connection protrusions 311 and the second connection protrusions 312 protruding from the surface of the front-side housing 320 are heated and fused, and the rear-side housing 310 and the front-side housing 320 are strongly coupled to each other to integrate the multi-pole fusible link 200 and the housing 300 with each other. In this case, as shown in FIGS. 2(a) and 2(b), only the misassembly-preventing protrusion 330 disposed at the lower-end side of the housing 300 of the fuse 100 protrudes from the surface of the housing 300. The housing 300 includes a transparent window W formed therein to make it possible to visually check the fusible parts 230 from the outside.

As will be described later, the fuse 100 includes fuses of different types having similar shapes. For example, the resistances of the fusible parts 230 of the multi-pole fusible link 200 may be changed, or the input terminal part 210 may be changed in shape. Even though such changes are made, the entire shape of the multi-pole fusible link 200 is not drastically changed in principle. For this reason, the housing 300 can be attached to each of the multi-pole fusible links 200 of different types without a problem, and is used as a common part.

Figure 3A:
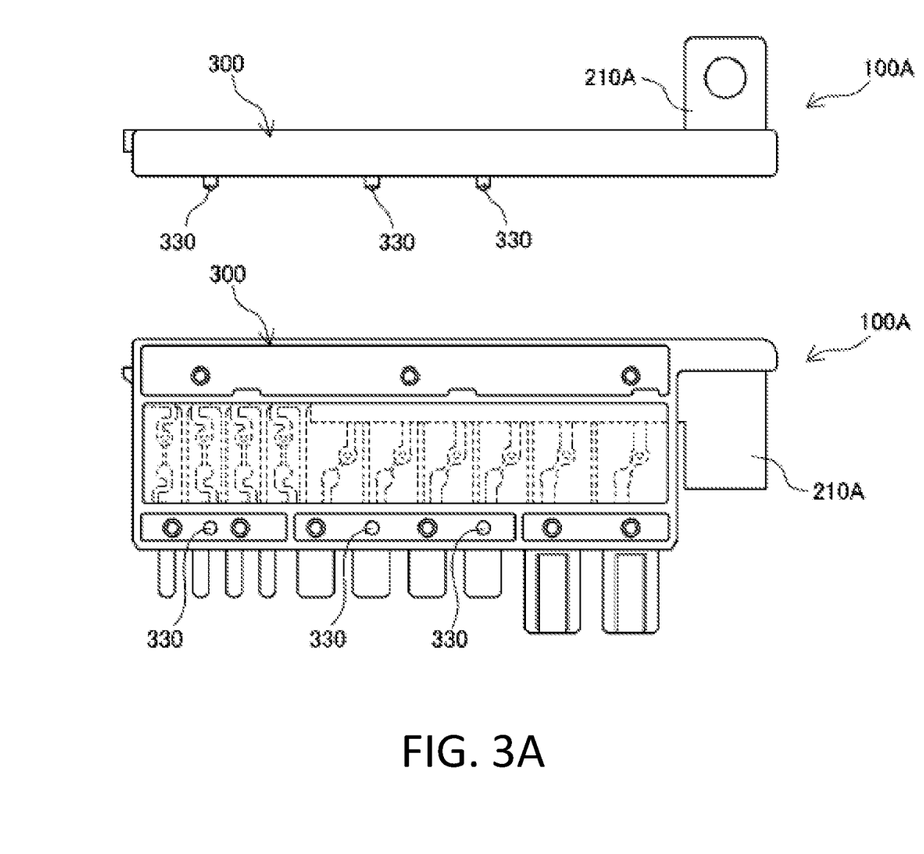
FIG. 3(a) shows plan and front views of the fuse according to the present invention.
Figure 3B:
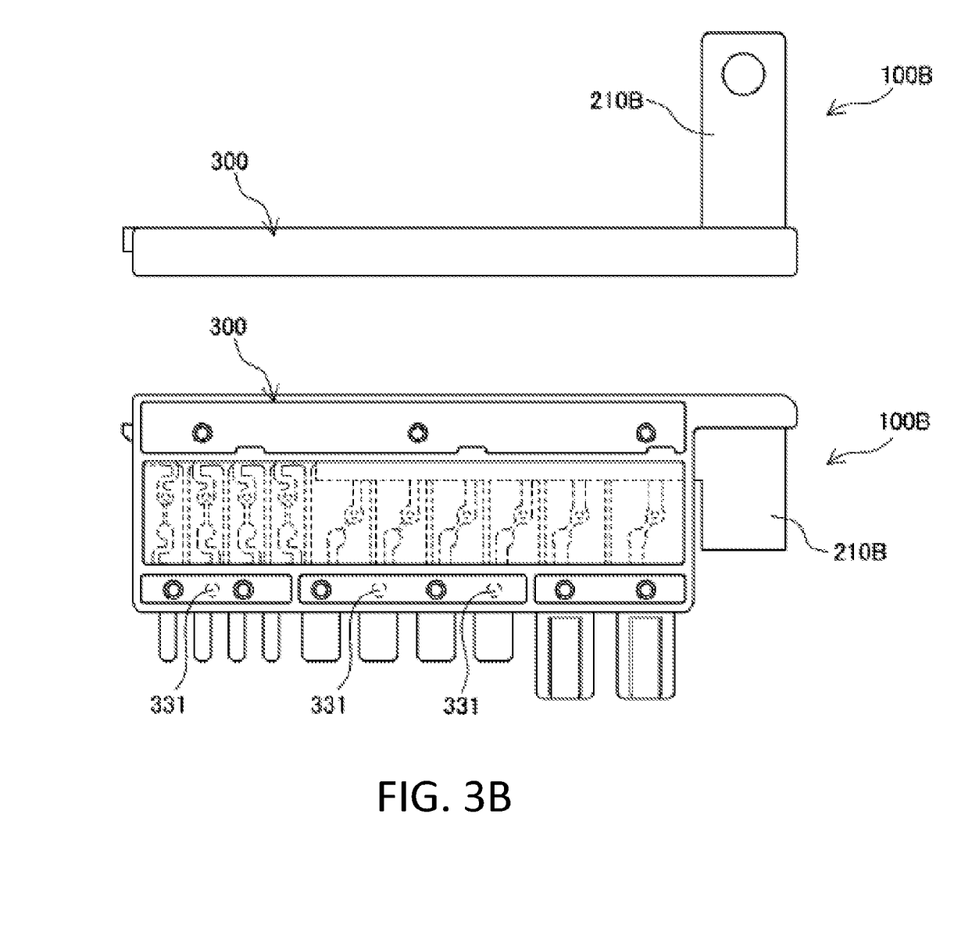
FIG. 3(b) shows plan and front views of a fuse different in type from the fuse shown in FIG. 3(a).

A method of using the housing 300 will be described below. In a fuse box (will be described later), a plurality of fuses of different types are normally inserted and contained. In Embodiment 1, as shown in FIGS. 3(a) and 3(b), a case using two fuses 100A and 100B of different types are described.

The fuse 100A and the fuse 100B have the common housings 300 attached thereto, respectively, by the method shown in FIGS. 1(a) and 1(b) and FIGS. 2(a) and 2(b). However, as shown in FIGS. 3(a) and 3(b), the fuses are fuses of different types having an input terminal part 210A and an input terminal part 210B which have different lengths, respectively. Thus, in order to differentiate the fuses, the misassembly-preventing protrusions 330 of the housings 300 attached to the fuse 100A and the fuse 100B are used.

More specifically, the misassembly-preventing protrusions 330 of the housing 300 of the fuse 100A are left without being removed. On the other hand, all the misassembly-preventing protrusions 330 of the housing 300 of the fuse 100B are heated and removed. (Note that FIG. 3(b) shows removal dents 331 obtained after the misassembly-preventing protrusions 330 are removed.)

When the removing operation is performed subsequently to an operation, which is described with reference to FIG. 1(b), of heating and fusing the first connection protrusions 311 and the second connection protrusions 312 protruding from the surface of the front-side housing 320 to couple the rear-side housing 310 and the front-side housing 320 to each other, good operating efficiency can be obtained. In the first embodiment, the misassembly-preventing protrusions 330 are heated and removed. In addition to the method described above, however, any method which can remove the misassembly-preventing protrusions 330 such as a method of physically cutting the misassembly-preventing protrusions 330 can be arbitrarily employed.

Figure 4A:
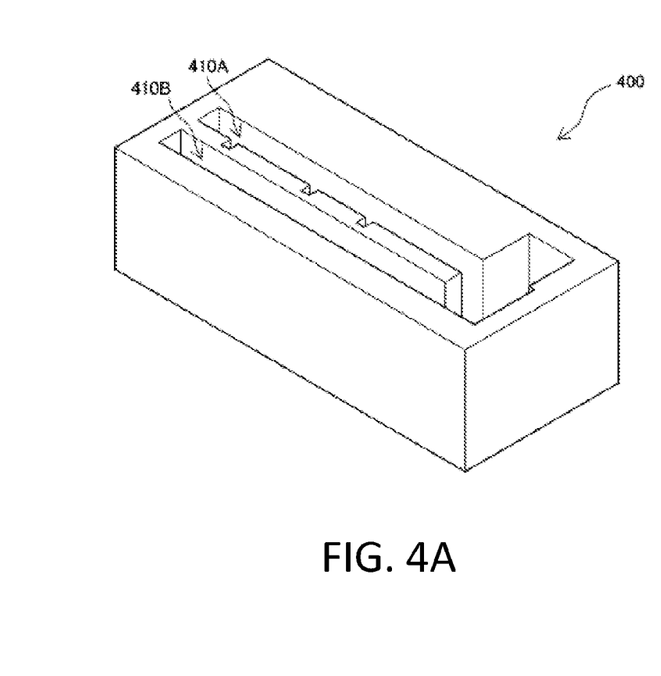
FIG. 4(a) is an overall perspective view of a fuse box according to the present invention.
Figure 4B:
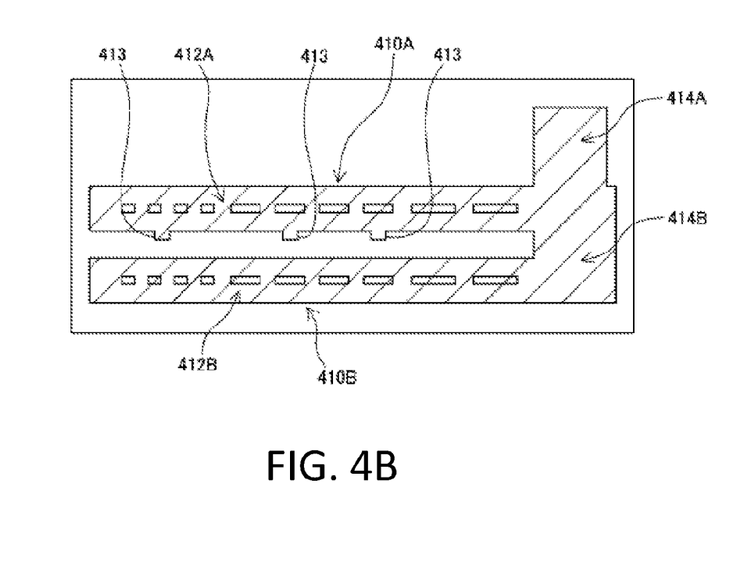
FIG. 4(b) is a plan view of the fuse box.

A fuse box 400 according to the present invention will be described below with reference to FIGS. 4(a) and 4(b). The fuse box 400 includes a containing part 410A to contain the fuse 100A shown in FIGS. 3(a) and 3(b) and a containing part 410B to contain the fuse 100B. The containing part 410A, in order to make it possible to insert the fuse 100A from the above, includes a housing containing part 412A which can contain the housing 300 of the fuse 100A, recesses 413 which can contain the misassembly-preventing protrusions 330 which are left without being removed, and a terminal containing part 414A which can contain the input terminal part 210A of the fuse 100A. The containing part 410B includes a housing containing part 412B which can contain the housing 300 of the fuse 100B and a terminal containing part 414B which can contain the input terminal part 210B of the fuse 100B.

Figure 5A:
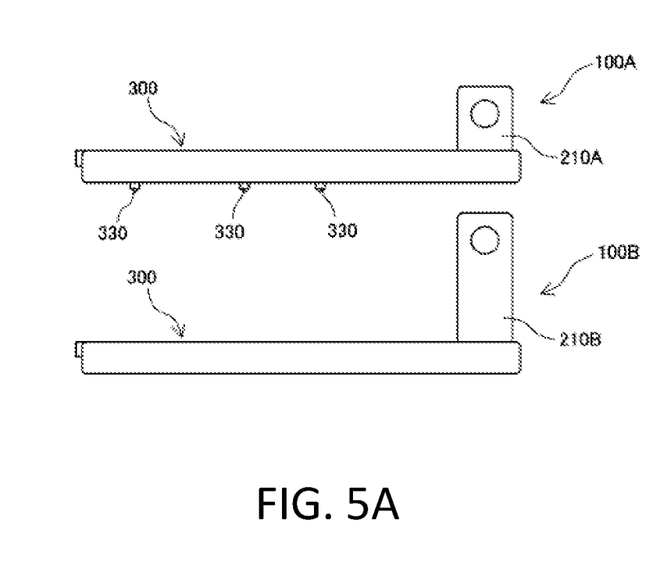
FIG. 5(a) is a plan view of the fuse shown in FIGS. 3(a) and 3(b), and FIGS. 5(b) and 5(c) are plan views in which the fuse is attached to the fuse box shown in FIGS. 4(a) and 4(b).

Prevention of misassembly of the fuse 100A and the fuse 100B to the fuse box 400 will be described below with reference to FIGS. 5(a) to 5(c).

An original assembly position will be described first. It is correct that the fuse 100A is contained in the containing part 410A and the fuse 100B is contained in the containing part 410B. However, a user may not be able to recognize which containing part 410 each of the fuses 100 is correctly attached to.

More specifically, since both the containing part 410A and the containing part 410B have similar shapes and are adjacent to each other, the user may not correctly determine which containing part the fuse 100A should be contained in. However, since the recesses 413 which can contain the misassembly-preventing protrusions 330 are not formed in the containing part 410B, the fuse 100A cannot be contained because the misassembly-preventing protrusions 330 of the fuse 100A contact with the opening edge of the containing part 410B. For this reason, even when the user tries to contain the fuse 100A in the containing part 410B by accident, the fuse 100A cannot be physically contained in the containing part 410B due to the presence of the misassembly-preventing protrusions 330 of the fuse 100A to reliably prevent misassembly.

The misassembly-preventing protrusions 330 can be disposed at arbitrary positions of the housing 300. In the first embodiment, since the misassembly-preventing protrusions 330 are disposed on the lower end side of the housing 300, in an early phase before the fuse 100A is deeply inserted into the containing part 410B, the misassembly-preventing protrusions 330 contact with the opening edge of the containing part 410B. For this reason, the user can know at an early stage that the fuse is likely to be contained in a wrong place.

Figure 5B:
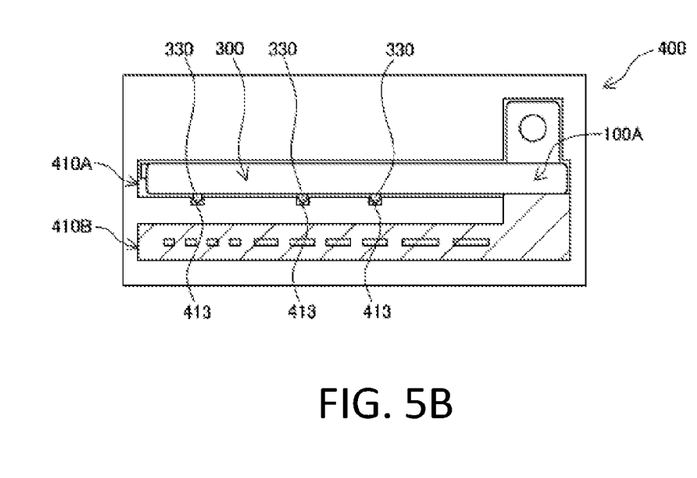

On the other hand, since the recesses 413 are formed at positions corresponding to the misassembly-preventing protrusions 330, respectively, in the containing part 410A, as shown in FIG. 5(b), the fuse 100A can be contained in the containing part 410A.

Figure 5C:
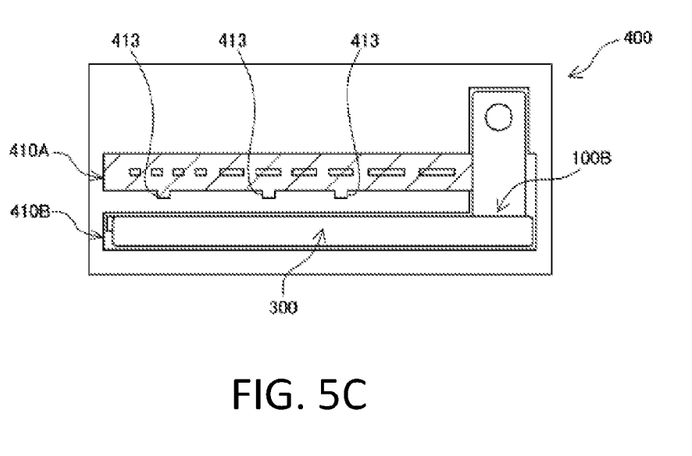

Since the fuse 100A can be contained in only the containing part 410A, as shown in FIG. 5(c), it is understood that the other fuse 100B should be contained in the containing part 410B. Thus, the fuse 100A and the fuse 100B are contained in the predetermined correct containing parts, respectively, and are not fitted on wrong places.

Furthermore, the housing 300 including the misassembly-preventing protrusions 330 is a common part which can be fitted to each of both the fuse 100A and the fuse 100B, and the misassembly-preventing protrusions 330 can be removed afterward as needed to make it possible to differentiate the fuses 100A and 100B from each other and to prevent misassembly. Costs required for this are considerably lower than those required when, as in the conventional technique, a new die or the like for forming a housing is prepared to change the shape of the housing itself depending on the types of multi-pole fusible link.

In the first embodiment, as an order of fitting the fuse 100A and the fuse 100B, it is correct that the fuse 100A is contained in the containing part 410A after the fuse 100B is contained in the containing part 410B. The input terminal part 210A of the fuse 100A is configured such that the input terminal part 210A can be contained to overlap the input terminal part 210B of the fuse 100B. On the other hand, when the input terminal part 210B of the fuse 100B is overlapped on the input terminal part 210A of the fuse 100A, the input terminal part 210B contacts with the upper end of the housing 300 of the fuse 100A. For this reason, the input terminal part 210B of the fuse 100B is configured such that the input terminal part 210B cannot be contained to overlap the input terminal part 210A the fuse 100A.

Assume that a user erroneously recognizes this order to try to contain the fuse 100A in the fuse box 400 first. However, as described above, since the fuse 100A cannot be physically contained in the containing part 410B, it is understood that the fuse 100A should be contained in the containing part 410A. The user tries to contain the fuse 100B in the containing part 410B. However, since the input terminal part 210B of the fuse 100B contacts with the upper end of the housing 300 of the fuse 100A contained in the containing part 410A first, the fuse 100B cannot be physically contained in the containing part 410B. Thus, the user comes to know that the order of containing the fuse 100A and the fuse 100B is erroneous.

Second Embodiment

A second embodiment of the present invention will be described below with reference to FIGS. 6(a) and 6(b). In the configuration of a housing 700, a misassembly-preventing protrusion 731 and a misassembly-preventing protrusion 732 of the housing 700 are different from the misassembly-preventing protrusions 330 of the housing 300 shown in FIGS. 1(a) and 1(b) in number and position. However, since the housing 700 is in common with the housing 300 in other points, the common constituent elements will not be described below. The configurations of a multi-pole fusible link 600A and a multi-pole fusible link 600B have the fusible parts 230 having resistances different from the resistances of the fusible parts 230 of the multi-pole fusible link 200 shown in FIGS. 1(a) and 1(b). However, since the multi-pole fusible link 600A and the multi-pole fusible link 600B are in common with the multi-pole fusible link 200 in other points, the common constituent elements will not be described below.

Figure 6A:
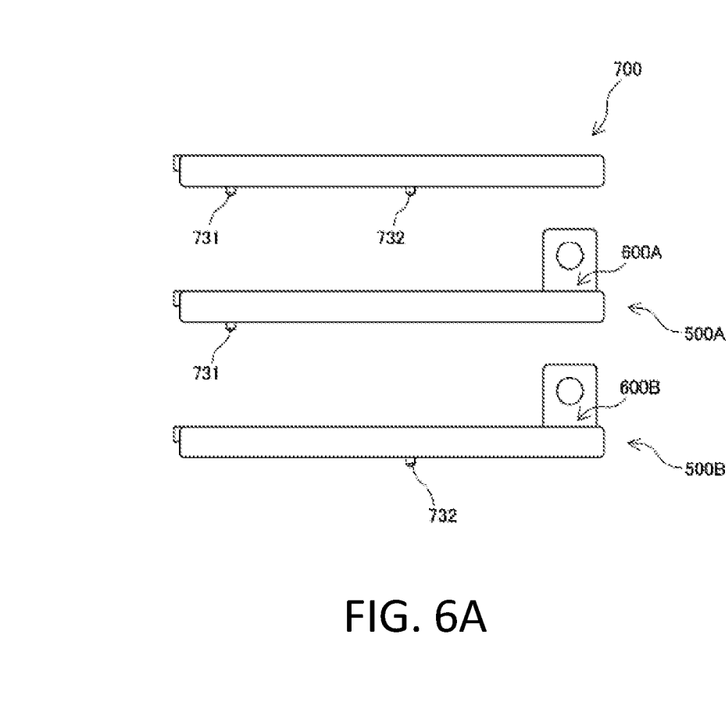
FIG. 6(a) is a plan view showing a housing and a fuse according to another embodiment of the present invention.

As shown in FIG. 6(a), each of the multi-pole fusible link 600A and the multi-pole fusible link 600B are multi-pole fusible links of different types having different resistances of fusible parts. However, since the multi-pole fusible links are similar to each other in entire shape, the housing 700 is a common part which can be attached to each of the multi-pole fusible link 600A and the multi-pole fusible link 600B.

In a fuse 500A, only the misassembly-preventing protrusion 732 is removed depending on the type of the multi-pole fusible link 600A. In a fuse 500B, only the misassembly-preventing protrusion 731 is removed depending on the type of the multi-pole fusible link 600B.

Since the shapes of the multi-pole fusible links 600 are similar to each other, the types of the multi-pole fusible links 600 are difficult to be differentiated from each other, and it may be difficult to determine which of the misassembly-preventing protrusion 731 and the misassembly-preventing protrusion 732 should be selectively removed depending on the types.

In this case, by using the input terminal part and the output terminal part that are exposed from the housing 700, the types of the multi-pole fusible links 600 can be differentiated from each other. More specifically, since the multi-pole fusible links 600 have different resistances of fusible parts, a resistance between the input terminal part and the output terminal part is measured to make it possible to measure resistances of the fusible parts located between the input terminal part and the output terminal part. In this manner, the resistances of the fusible parts of the multi-pole fusible links 600 are measured to differentiate the types of the multi-pole fusible links 600, and, depending on the types, the misassembly-preventing protrusion 731 or the misassembly-preventing protrusion 732 is selectively removed.

In addition to the method described above, when marks are printed on the peripheries of the fusible parts to make it possible to visually recognize the resistances of the fusible parts, the marks can be checked from the transparent window W of the housing 700. The types of the multi-pole fusible links 600 are differentiated from each other by the marks to make it possible to selectively remove the misassembly-preventing protrusion 731 or the misassembly-preventing protrusion 732 depending on the types.

Figure 6B:
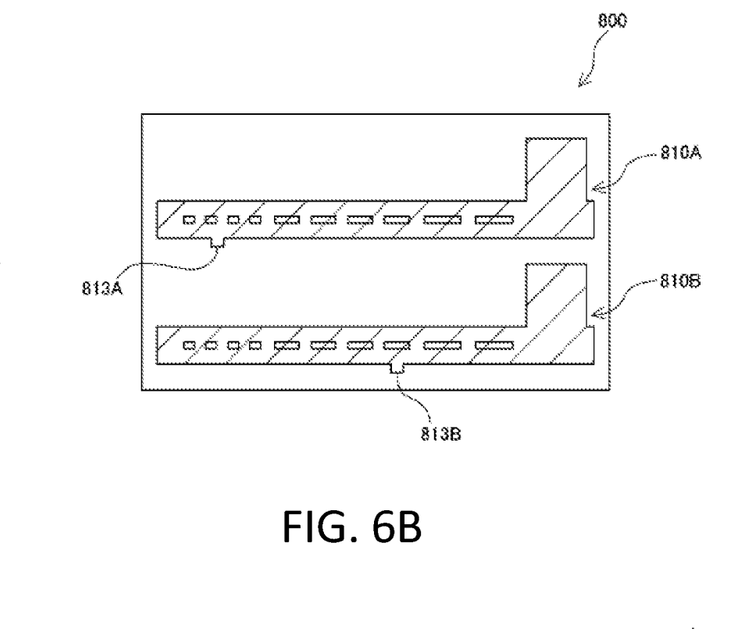
FIG. 6(b) is a plan view of a fuse box corresponding to the fuse.

A fuse box 800, as shown in FIG. 6(b), includes a containing part 810A which can contain the fuse 500A and a containing part 810B which contain a fuse 500B. In the containing part 810A, a recess 813A which can contain the misassembly-preventing protrusion 731 of the fuse 500A is formed at a position corresponding to the misassembly-preventing protrusion 731. In the containing part 810B, a recess 813B which can contain the misassembly-preventing protrusion 732 of the fuse 500B is formed at a position corresponding to the misassembly-preventing protrusion 732. In this manner, in each of the containing parts 810, each of the recesses 813 is formed at only a position corresponding to each of the misassembly-preventing protrusions of the fuses 500 to be contained in the corresponding containing part 810.

Prevention of misassembly of the fuse 500A and the fuse 500B to the fuse box 800 will be described below with reference to FIGS. 6(a) and 6(b).

Assume that a user tries to contain the fuse 500A in the containing part 810B by accident. However, the misassembly-preventing protrusion 731 of the fuse 500A contacts with the opening edge of the containing part 810B to prevent the fuse 500A from being physically contained in the containing part 810B. More specifically, since the fuse 500A can be contained in only the containing part 810A, the user does not fit the fuse 500A in a wrong place other than the containing part 810A.

Assume that the user tries to contain the fuse 500B in the containing part 810A by accident. However, the misassembly-preventing protrusion 732 of the fuse 500B contacts with the opening edge of the containing part 810A to prevent the fuse 500B from being physically contained in the containing part 810A. More specifically, since the fuse 500B can be contained in only the containing part 810B, the user does not fit the fuse 500B in a wrong place other than the containing part 810B.

The fuse 500A can be contained in only the containing part 810A, and the fuse 500B can be contained in only the containing part 810B. For this reason, each of the fuse 500A and the fuse 500B is not erroneously fitted.

In this manner, at least the two misassembly-preventing protrusions 731 and 732 are selectively used to make it possible to differentiate two types of fuses, i.e., the fuse 500A and the fuse 500B, from each other in terms of shape, the fuse 500A can be contained in only the containing part 810A, and the fuse 510B can be contained in only the containing part 810B. For this reason, the two fuses 500 are fitted in the correct containing parts, respectively.

As in the second embodiment, in addition to the use of the two misassembly-preventing protrusions 731 and 732, when the number of misassembly-preventing protrusions is increased to at least three or more, fuses of three or more types can be differentiated from each other in terms of shape, and misassembly between the fuses of three or more types can be prevented.

The housing, the fuse, and the fuse box according to the present invention are not limited to those in the embodiments described above, various modifications and various combinations can be effected within the scope described in the scope of claims and the scope of the embodiments, and the modifications and the combinations are also included in the scope of rights.

INDUSTRIAL APPLICABILITY

The housing, the fuse, and the fuse box according to the present invention are not only applied to an automobile electric circuit, but also are used as fuses in electric circuits for various applications. The applications are included in the scope of the present invention as a matter of course.

REFERENCE SIGNS LIST

100: Fuse
200: Multi-pole fusible link
300: Housing
330: Misassembly-preventing protrusion
400: Fuse box
413: Recess

The invention claimed is:

1. A fuse comprising:
a multi-pole fusible link and a housing attached to a part of the multi-pole fusible link, the fuse is inserted and contained in a containing part of a fuse box, wherein
a misassembly-preventing protrusion that is removable depending on the type of the multipole fusible link at the lower-end side of the outer side surface of the housing,
wherein the misassembly-preventing protrusion protrudes outwardly from the outer side surface of the housing in a stick shape,
wherein the position of the misassembly-preventing protrusion corresponds to the position of a recess configured to receive the misassembly-preventing protrusion and which is formed in the side surface of the containing part where the fuse is contained.

2. The fuse according to claim 1, wherein a plurality of the misassembly-preventing protrusions are formed.

3. A fuse box including a containing part which can contain the fuse according to claim 2, wherein a recess which can contain a misassembly-preventing protrusion disposed in a housing for the fuse is formed in the containing part.

4. A fuse box including a containing part which can contain the fuse according to claim 1, wherein a recess which can contain a misassembly-preventing protrusion disposed in a housing for the fuse is formed in the containing part.

* * * * *